Aug. 19, 1969          S. A. T. TJADERKLOU                 3,461,792
       APPARATUS FOR STORING AND SEASONING OF RAW ROOT
               VEGETABLES, SPECIALLY POTATOES
                    Filed Oct. 7, 1966
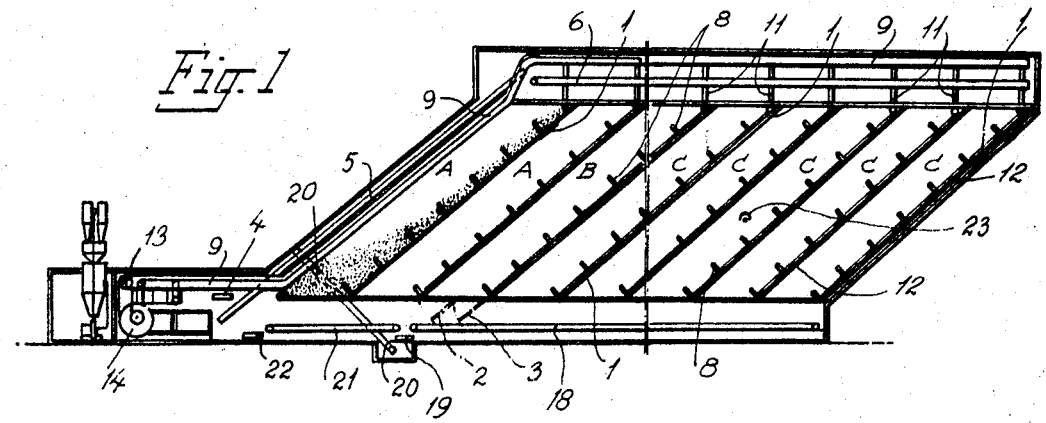
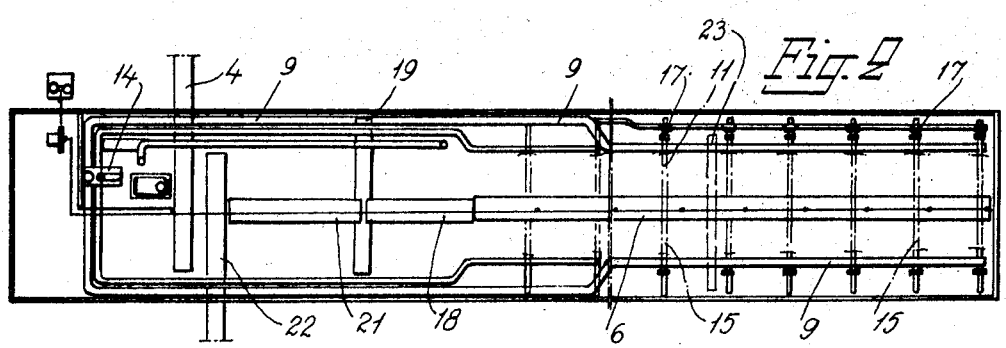
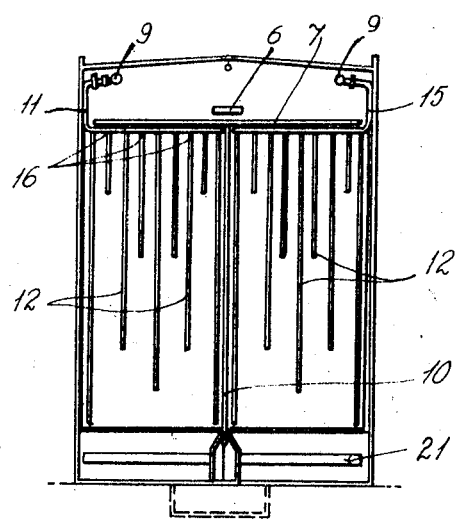
INVENTOR 3,461,792
APPARATUS FOR STORING AND SEASONING
OF RAW ROOT VEGETABLES, SPECIALLY
POTATOES
Sven Anders Torbjorn Tjaderklou, Solna, Sweden, assignor to Solanum Aktiebolag, Solna, Sweden
Filed Oct. 7, 1966, Ser. No. 591,363
Int. Cl. A47j 47/02; A23l 1/12; A23b 7/00
U.S. Cl. 99—271          14 Claims

ABSTRACT OF THE DISCLOSURE

Device for storing and seasoning raw vegetable products comprising a plurality of adjacent inclined storing bins having doors at the bottom thereof and being provided with means for controlling the humidity and temperature in the bins and being further provided with means for conveying the product to other places of treatment.

---

The present invention relates to a new and useful device for storing and seasoning of raw root vegetables, specially potatoes.

Until now it has been common practice to store larger quantities of potatoes in usually square bins with a sloping bottom for the discharge of said vegetables. Mostly, such bins have been used only for potatoes while other vegetables such as sugar-beets, turnips and the like are stored under controlled conditions in cellars or the like. The means and apparatus respectively, according to the present invention is equally suited for the storage of potatoes, sugar-beets, turnips and other heavy vegetables and allows a continuous control and seasoning of the vegetables thus stored during a prolonged storing time.

In the known storage bins the storage heights of potatoes theoretically is about eleven feet which value is based on one hand on the allowable height of fall of the potatoes and on the other hand on the allowable pressure applied to the potatoes in the bottom layer of said bin.

As already mentioned the bottom of such a bin further must have a sloping surface for the discharge of the potatoes which substantially reduces the volume of the bin, which facts reduces the storage volume for each bin to a predetermined value.

Moreover, the known bins afford no possibility for controlling the stored potatoes with respect to sprouting and plant deseases. It is a common known fact that the temperature in the central part of such a bin becomes higher than the temperature towards the sides of the bin. Since the potatoes often are infected with certain types of plant disease caused by different germs a rise of the temperature favours the growth of such germs which results in an increasing infection of the potatoes which may cause all of the potatoes in the bin to be infected. Even if theoretically such a desease could be located the known bins offer no possibility for a control discharge and recharging.

In order to prevent sprouting of the potatoes during storage it is common practice to treat the potatoes with vapors of higher alcohols. By potatoes stored in known bins this is attempted by introducing such alcoholic vapors through a perforated bottom in the bin. However, in practice said vapors do not pass through the mass of the potatoes in the bin but instead pass along the walls of said bin which means that the mass of potatoes remains untreated and in consequence thereof sprouts in an uncontrollable way, causing further losses of the stored vegetables. Again, there is no possibility to control the processes occuring in the storage bin.

In order to overcome said unsatisfying storing conditions which generally have been accepted the potatoes have been subjected to a physical treatment after the storing time, in expensive apparatus prior to use, said treatment apparatus only being used once or twice a year which means a poor investment.

The present invention is directed to a device for overcoming said deficiencies said device comprising a number of storing bins arranged adjacent each other, the sides of said bins being inclined towards the horizontal plane, closure means at the bottom of said bins, means for controlling the humidity and temperature in the individual bins and means for conveying said vegetables from a bin to another place of treatment.

One object of the invention is the provision of one or more sloping bins for a final conditioning of the vegetables prior to use, said bins being connected with the sloping storing bins by means of conveyors for transporting the vegetables from the storage bins to said conditioning bins.

Another object of the invention is the provision of means for regulating the temperature and the humidity in the storing bins and at the same time to control the supply of anti-sprouting compounds to the vegetables.

Still another object of the invention is to provide means to prevent harming the vegetables when introduced into the bins.

A further object of the invention is the provision of means for moving the vegetables from one storage bin to another bin when deseases or other circumstances make a special treatment of the vegetable necessary. Such a bin will in the following be designated as a desease treating bin.

A still further object of the invention is the provision of means for treating the earth having adhered to the vegetables in order to desinfect the same.

Other objects and advantages of the invention will be apparent and better understood from the following description which, in connection with the accompanying drawing, discloses a preferred embodiment thereof.

Referring to the drawing:

FIGURE 1 is a vertical view through a storage device according to the invention with conditioning and treating means for the vegetables stored.

FIGURE 2 is a view of the same device seen from above, and

FIGURE 3 is cross-section through the device according to FIGURE 1.

The device comprises a series of bins A, B, C the side walls 1 of which are inclined against the horizontal plane. Each bin is at its bottom part provided with hinged doors 2, 3 which preferably are pneumatically operated from a central control panel (not shown). The doors 2, 3 for each bin are individually operable. The bins designated A and B respectively serve a special purpose as will be understood from the following description.

The vegetables to be stored are unloaded from delivering cars unto a conveyor 4 and therefrom onto an elevator 5, for instance a bucket-elevator, which empties the vegetables onto a conveyor 6 running lengthwise above all of said bins. Cross-wise and under the conveyor 6 is a further conveyor 7 movably arranged for allowing the same to be moved to a position above any of the bins.

By means of scrapers arranged above the conveyor 6 and above each bin the vegetables fed by conveyor 6 are scraped down onto the cross-conveyor 7 which then feeds vegetables down into the desired bin. Each of said scrapers are individually operated from said central panel.

In order to prevent harming the vegetables when chuting the same into the bins which have an appreciable height, for instance about 15 yards, the sloping walls are provided with upstanding edgings 8 extending over the width of the bins. The edgings may have a height of 20″ to 40″ and are preferably made of a slightly elastic material. When the vegetables are fed into a bin they are arrested by the first edging and not until the pocket between the wall of the bin and the edging has been filled so far that the chute angle of the vegetables has been exceeded the vegetables fall down onto the next edging and so on.

The bins may be divided into two chambers by means of a vertical wall 10 (FIGURE 3) each of said chambers being fed by the cross-conveyor 7.

For treatment of the vegetables in the bins, for instance potatoes, a conditioning aggregate 13 is provided comprising a blower and a suction apparatus 14 and means for cooling and heating the air respectively and means to introduce moist vapors. From said aggregate leads a pipe up to the upper side of the bins and lengthwise over the same. Preferably said conduit is branched off into two conduits running parallel over the bins. Above each bin said conduits 9 have branch conduits 11, 15 extending perpendicularly to the conduits 9 and downwards below the underside of the cross-conveyor 7 and then horizontally to the underside of the same to dividing wall 10, said horizontal part of the branch conduits 11, 15 being provided with a number of nozzles 16 to which tubes 12 of varying length are connected, said tubes allowing conditioned air to be introduced at different levels of the bins.

Moreover, the supply conduits for conditioned air are connected to means 17 for introducing the vapors of higher alcohols, a known means for reducing sprouting of stored potatoes. Said means 17 conveniently comprises a known device in which the higher alcohols are dropped onto a heated plate in a chamber for evaporizing the same, said chamber being connected to said air conduit.

For the discharge of the vegetables and their transport to a processing plant or to another bin a continuous conveyor 18 is arranged below the bottom doors 2, 3, of each bin C. Said conveyor 18 discharges the vegetables onto a conveyor 19 running transversely to said conveyor 18, the conveyor 19 transporting the vegetables to an elevator 20 which empties the vegetables into the feeding bucket elevator 5 from which the vegetables may be returned to any bin as already desired, but preferably to the bins A for a last conditioning treatment before they are discharged from the bottom doors of the bins A onto a conveyor 21 and therefrom to a transversally running discharge conveyor 22 from which the vegetables are transported to said further processing place.

By means of the conditioning aggregate 13 temperature and humidity conditions are varied in said bins A. Should diseases develop in any of the bins C the vegetables may be transported back to one of the bins A for a special treatment. However, it is preferred to reserve a special bin B for the treatment of such potatoes.

The sloping side walls of the bins preferably are constructed of wood planks inserted from above in opposite grooves formed by U-irons mounted on the inside of the longitudinal walls of the device. The surfaces of said planks are preferably covered by aluminum sheets in order to facilitate the cleaning of the bins.

For cleaning purposes of the bins a carriage is arranged to run along the inside sloping surfaces of the bins, said carriage being handled by a worker who sprays the inside of said bins with water, possibly under addition of disinfection agents.

Should disease be discovered in any of the bin means 23 in the form of downwards open channels or the like extending transversally into the bins may be used for removing such vegetables by suction.

According to the present invention the method of treating vegetables—preferably potatoes—in the device above described is as follows.

The vegetables are delivered to the individual bins C by means of the conveyor means 5, 6 and 7 in which bins the humidity and temperature is controlled with respect to storing conditions. Since for instance, potatoes are delivered in a fresh condition with weak peals to said bins and moreover are covered with earth which may contain germs causing diseases it may be preferred to condition the vegetables immediately after filling of a bin—which for instance may contain 135 tons of vegetables—by treating the vegetables with air with a moisture content of about 10% and at a temperature of 50° to 59° F. whereby the peels are hardened and possible germs mostly inactivated or killed. Such a treatment should be done within the first week of storage.

The moisture content of the conditioning air is then raised by addition of water vapor to about 90% and the temperature lowered to the range of about 39° to 50° F. for the main rest of the storing time by means of the conditioning aggregate 13. By means of the tubes 12 extending to different depths of the bins an equal atmosphere is obtained throughout the bins.

When the vegetables, specially potatoes, are to be used for further processing, such as the making of pommes chips and like products, the contents of one bin is transferred to a bin A by means of the conveyors 18, 19, 20, 5, 6 and 7 in which bin or bins the temperature is raised to about 68° to 86° F. whereby the sugar content is reduced. This is essential in order to obtain a final product of even quality and even color.

Should in spite of a preliminary treatment of the potates immediately after storing deseases be discovered in one of the bins, usually in the core of the same, infected vegetables may be drawn off by suction by the means 23 or the whole content of said A bin may be discharged and fed back to the desease bin B. In this bin the vegetables are conditioned with air with a low moisture content, for instance 5 to 10% by which measure the germs are killed. The potatoes than may be fed to one of the final conditioning bins A or be returned to the original storing bin C by means of the conveyors. Before returning the vegetables to the storing bin said bin should be cleaned and disinfected.

In an apparatus according to the invention large amounts of earth collect. In an apparatus of the dimensions above described about 30 tons of earth are collected from the storing bins. Should such earth be infected by germs such as nematodes the earth must be treated at elevated temperatures, generally above 220° to 230° F. in order to kill such germs to allow the earth to be reused.

Such a treatment is made possible for instance by sucking the earth which has fallen down through the opened bottom doors out of the apparatus by means of the blower 14 and into a treating vessel (not shown) in which steam or air of a temperature of 220° to 230° F. or higher is introduced.

As evident from the above description the apparatus according to the present invention allows storage and treatment of root vegetables in a complete new and economical way.

What I claims is:

1. A device for storing and seasoning of raw root crops of the group comprising potatoes, sugar beets, turnips, and the like, comprising a number of storing bins arranged adjacent each other, the sides of said bins being inclined towards the horizontal plane, closure means at the bottom of said bins, means for controlling the humidity and temperature in the individual bins and means for conveying said vegetables from a bin to another place of treatment.

2. A device according to claim 1 in which the means for controlling humidity and temperature in the individual bins comprises means for circulating air with regulated moisture and temperature through said bins.

3. A device according to claim 2 in which the conditioned air is supplied to the bins, from a supply pipe through a number of tubes of different length extending from the upper side to the lower side of said sloping walls.

4. A device according to claim 1 in which the means for controlling humidity and temperature in the bins includes a device for evaporizing a higher alcohol the vapors of which through suction of the regulated air stream are brought into the bins for controlling of sprouting.

5. A device according to claim 1 in which the sloping walls of one bin forms one sloping side wall of an adjecent bin.

6. A device according to claim 1 in which the earth collected from said vegetables is removed from the apparatus and transported to a vessel with means for supplying a gaseous medium having a temperature above 212° F.

7. A device for storing and seasoning of raw root crops of the group comprising potatoes, sugar beets, turnips, and the like, comprising a number of storing bins arranged adjacent each other, the sides of said bins being inclined towards the horizontal plane, closure means at the bottom of said bins, means for supplying vegetables to an optional bin, means for controlling the humidity and temperature in the individual bins and means for conveying said vegetables from a bin to another place of treatment.

8. A device for storing and seasoning of raw root crops of the group comprising potatoes, sugar, beets, turnips, and the like, comprising a number of storing bins arranged adjacent each other, the sides of said bins being inclined towards the horizontal plane, closure means at the bottom of said bins, means for conveying the vegetables from one bin to another, means for controlling the humidity and temperature in the individual bins and means for conveying said vegetables from a bin to another place of treatment.

9. A device according to claim 8 in which said other bin is a conditioning bin for controlling the sugar content of the potatoes.

10. A device according to claim 9 in which the bottom of said conditioning bin opens onto a separate conveyor connected to means for discharging the vegetables from the apparatus for further processing.

11. A device according to claim 8 in which said other bin is a bin for controlling and overcoming of deseases in the vegetables stored.

12. A device for storing and seasoning of raw root crops of the group comprising potatoes, sugar beets, turnips, and the like, comprising a number of storing bins arranged adjacent each other, the sides of said bins being inclined towards the horizontal plane, closure means at the bottom of said bins, means for supplying vegetables to an optional bin, means for conveying the vegetables from one bin to another, means for controlling the humidity and temperature in the individual bins and means for conveying said vegetables from a bin to another place of treatment.

13. A device according to claim 12 in which the means for conveying the vegetables to an optional bin comprises a first horizontal conveyer, an inclined conveyor leading to the top of the bins, a lengthwise over the bins running second horizontal conveyor, and a cross-wise to said second conveyor arranged third horizontal conveyor which is movable across said bins and stoppable over any of said bins to receive vegetables from said second conveyor and to discharge such vegetables sidewards in said bin.

14. A device according to claim 12 in which said means for conveying the vegetables from one bin to another includes said bottom closure means, a conveyor arranged under said bottom closure means lengthwise to said bins, and at least a second inclined conveyor connected with the top part of said bins, said conveyor means being connected to the conveyor means for conveying the vegetables to an optional bin.

References Cited

UNITED STATES PATENTS

| 1,995,551 | 3/1935 | Shodron | 99—271 |
| 2,251,617 | 8/1941 | Pirnie | 99—271 X |
| 2,572,826 | 10/1951 | Shaw | 99—269 |

ROBERT W. JENKINS, Primary Examiner

U.S. Cl. X.R.

99—100, 154